US010515222B2

(12) United States Patent
Adams (10) Patent No.: US 10,515,222 B2
(45) Date of Patent: Dec. 24, 2019

(54) ELECTRONIC DEVICE INCLUDING DISPLAY AND METHOD OF ENCRYPTING INFORMATION (71) Applicant: BlackBerry Limited, Waterloo (CA)

(72) Inventor: Neil Patrick Adams, Waterloo (CA)

(73) Assignee: BlackBerry Limited, Waterloo (CA)

(*) Notice: Subject to any disclaimer, the term of this patent is extended or adjusted under 35 U.S.C. 154(b) by 232 days.

(21) Appl. No.: 15/816,845

(22) Filed: Nov. 17, 2017

(65) Prior Publication Data
US 2019/0156044 A1    May 23, 2019

(51) Int. Cl.
G06F 21/62        (2013.01)
G06F 21/60        (2013.01)
G06F 3/0484       (2013.01)
G06F 3/0488       (2013.01)

(52) U.S. Cl.
CPC ........ *G06F 21/602* (2013.01); *G06F 21/6209* (2013.01); G06F 3/04842 (2013.01); G06F 3/04883 (2013.01)

(58) Field of Classification Search
CPC ............... G06F 21/602; G06F 21/6209; G06F 21/6218; H04L 9/3073; H04L 63/0428
See application file for complete search history.

(56) References Cited

U.S. PATENT DOCUMENTS 8,737,614 B1    5/2014  Mulligan et al.
10,341,304 B1*  7/2019  Boutros .............. G06F 21/6218
2011/0302405 A1* 12/2011  Marlow .............. H04L 9/0841
                                                 713/150
2014/0015987 A1  1/2014  Harple et al.
2017/0150052 A1  5/2017  Haddad et al.

FOREIGN PATENT DOCUMENTS

EP      2518989 A2    10/2012
WO   2016147066 A1     9/2016

OTHER PUBLICATIONS

European Patent Application No. 18202491.9, Extended European Search Report dated Mar. 8, 2019.

* cited by examiner

*Primary Examiner* — Minh Dinh
(74) *Attorney, Agent, or Firm* — Borden Ladner Gervais LLP; Todd Keeler (57) ABSTRACT A method of encrypting information on an electronic device includes displaying information associated with an application running on the electronic device, receiving, via the application running on the electronic device, an input to initiate an encrypted camera application that is separate from the application running on the electronic device, initiating the encrypted camera application, determining an identity profile having an associated key, receiving an input from the encrypted camera application to collect image data with the camera, receiving image data from an image sensor of the camera, encrypting the image data utilizing the key associated with the determined identity profile to generate encrypted image data, adding the encrypted image data to a document associated with the application running on the electronic device.

20 Claims, 6 Drawing Sheets

ELECTRONIC DEVICE INCLUDING DISPLAY AND METHOD OF ENCRYPTING INFORMATION

FIELD OF TECHNOLOGY

The present disclosure relates to encrypting information on an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices are often able to store and display various types of information. In some situations, protection of the information stored and displayed on the device is desirable to inhibit others from accessing the information. For example, when sending information from the electronic device to an intended recipient's electronic device, it may be desirable to limit access to the information to only the intended recipient. Encryption of sensitive data may be utilized to protect sensitive data from being accessed by someone other than those intended to have access to the information.

Improvements in protection of such information are desirable.

BRIEF DESCRIPTION OF THE DRAWINGS

Embodiments of the present disclosure will now be described, by way of example only, with reference to the attached figures, in which.

DETAILED DESCRIPTION

The following describes an electronic device including a display and a camera and a method of encrypting information on the electronic device. The method includes displaying information associated with an application running on the electronic device, receiving, via the application running on the electronic device, an input to initiate an encrypted camera application that is separate from the application running on the electronic device, initiating the encrypted camera application, determining an identity profile having an associated key, receiving an input from the encrypted camera application to collect image data with the camera, receiving image data from an image sensor of the camera, encrypting the image data utilizing the key associated with the determined identity profile to generate encrypted image data, adding the encrypted image data to a document associated with the application running on the electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

Figure 1:
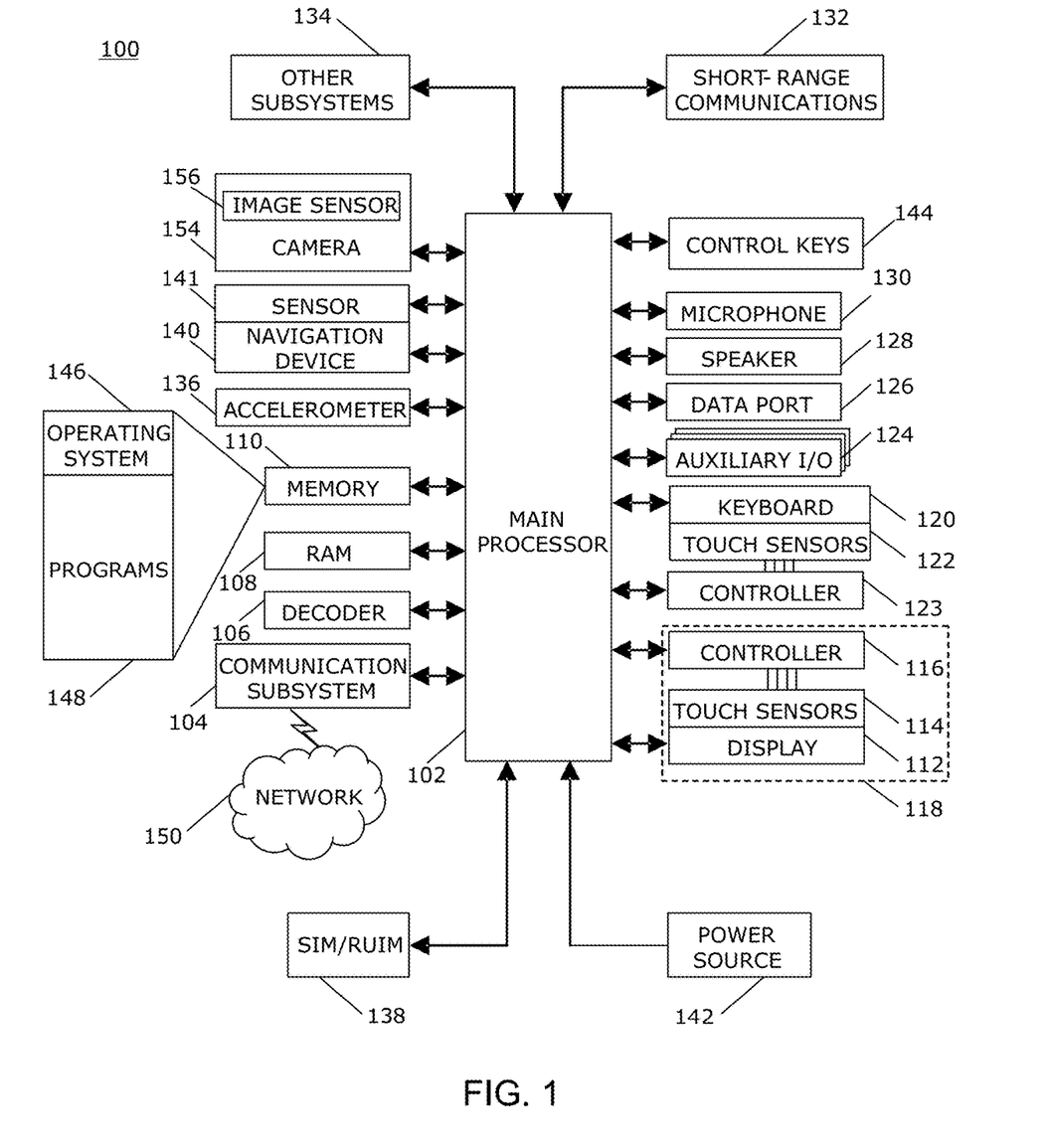
FIG. 1 is a block diagram of a portable electronic device in accordance with the present disclosure.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

The processor 102 also interacts with a plurality of control keys 144 and a navigation device 140. The control keys 144 may include, for example, a send key, a menu key, an escape key, an end key, or any other suitable control keys. The navigation device 140 may be a touch-sensitive track pad, an optical joystick, or any other suitable navigation device to interface with a user to provide input. The navigation device 140 may be utilized, for example, to navigate or scroll through information on a display, control a cursor or other indicator, edit information, and so forth.

The processor 102 also interacts with a biometric sensor 141 for obtaining data to authenticate a user. The biometric sensor 141 may be a fingerprint sensor disposed on the navigation device for detecting a touch thereon and obtaining fingerprint data upon receipt of a touch on the navigation device. Other biometric sensors may also be successfully implemented. For example, an iris scanner or other suitable detector may be utilized for the purpose of authenticating a user.

The processor also interacts with a camera 154 to take photographs or videos. The camera 154 includes an image sensor 156 that converts light entering the camera 154 into a digital image comprising image data. The camera 154 may include other elements in addition to the image sensor 156, such as for example one or more lenses (not shown) for focusing light onto the image sensor 156. The image data of the digital image, or in the case of video, the series of digital images, may be stored in the memory 110 in any suitable file type.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

In some instances, a user may wish to encrypt sensitive data that may be stored on the electronic device 100 or transmitted in association with an application, including, for example, text messaging applications, email applications, notes applications, calendar applications, and contacts applications. An issue with current electronic devices is that not all applications include security measures, such as encryption, in order to protect sensitive data. Additionally, for applications that include encryption functionality, generally different applications utilize different encryption keys to encrypt the data, meaning that sharing data from various applications requires also sharing the various associated encryption keys.

In order to overcome at least some of the issues of present electronic devices, the present disclosure provides an electronic device and method of encrypting image data captured by a camera of the electronic device in a manner that is separate from an application that the encrypted image data is added to such that the application does not have access to the original unencrypted image data.

Figure 2:
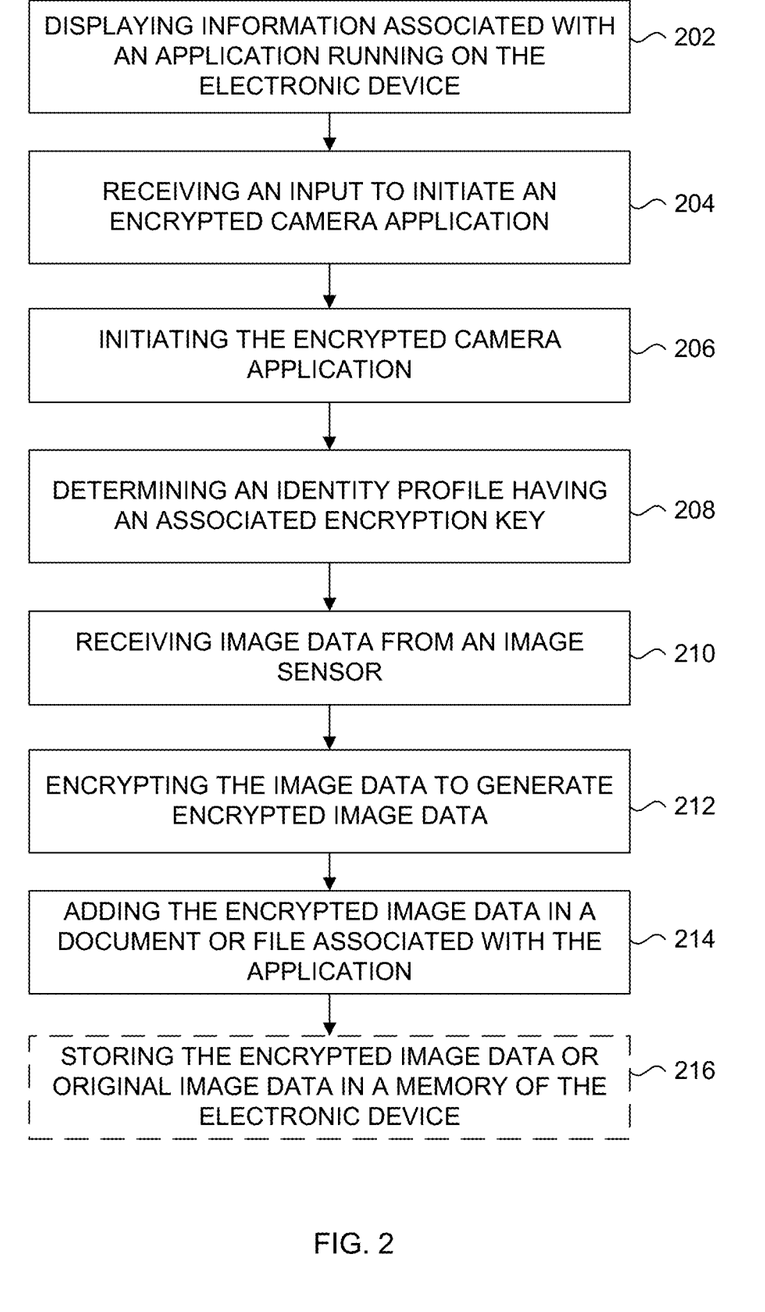
FIG. 2 is a flowchart illustrating a method of encrypting information in accordance with the present disclosure.

A flowchart illustrating a method of encrypting image data on an electronic device having a camera, such as the portable electronic device 100 having camera 154, is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium. The computer-readable code may be incorporated into an operating system, such as operating system 146, or may be incorporated into a stand-alone application, such as one of the programs 148, or may be a functionality built into a secured vault on the electronic device, such as a secured password database.

At 202, information associated with an application running on the electronic device is displayed on a display. An application may be considered "running on the electronic device" if, for example, the application has been opened, or launched, on the electronic device and is the application that is in focus, or active, on the electronic device. The application may be any suitable application including, for example, a text messaging application, an email application, a notes application, or a calendar application.

The information that is displayed may include the graphical interface components of the application, and may depend upon the particular application that is running on the electronic device. For example, the information associated with a text messaging application may include a text entry field for inputting text characters for a message to be sent, previous messages that have been sent in a particular conversation thread, and selectable elements associated with various functions associated with the text messaging application.

At 204, an input to initiate an encryption camera application is received. The input at 204 may be received via the application running on the electronic device. For example, the input may be a selection of a selectable feature associated with initiating an encryption camera application.

In an embodiment, the selectable feature may be, for example, an icon included in the information that is displayed at 202. Selection of the selectable feature by, for example tapping a location on a touch-sensitive display at a location associated with the selectable feature, may cause the encryption camera application. In an example, selecting the selectable feature may cause a menu to be displayed in which the user may select either a standard camera application or the encrypted camera application. Alternatively, the encryption camera application may be set by a user as a default camera application to utilize when selecting a camera application within the particular application running on the electronic device, or when the device has been placed into an encryption mode.

At 206, the encryption camera application is initiated at the electronic device. Initiating the encryption camera application may include opening the encryption camera application such that the encryption camera application is "running on the electronic device". Alternatively, initiating the encryption camera application may include displaying an overlay window that displays the encryption camera application over the application running on the electronic device.

Initiating the encryption camera may include performing authentication of the user of the electronic device by, for example, prompting the user to enter a password, or utilizing fingerprint or some other biometric verification. Alternatively, authentication may be performed after an image has been captured utilizing the encryption camera application but before the image data associated with the image is encrypted.

At 208, an identity profile having an associated encryption key is determined. A plurality of identity profiles may be stored on the electronic device. Each identity profile may include a unique identifier to identify the different identity profiles, and a unique encryption key that may be utilized to encrypt and decrypt data. An identity profile may be a primary identity profile or a shared identity profile.

A primary identity profile is the identity profile associated with the primary user of the electronic device. The encryption key associated with the primary identity profile may be utilized to encrypt and decrypt data that is intended to be accessible only by the primary user of the electronic device. The primary identity profile may include security settings that prevent the primary identity profile from being shared with, or viewed by, other electronic devices or other users.

A shared identity profile may be associated with a user, or group of users, other than the primary user of the electronic device. A shared identity profile is intended to be shared with electronic devices of another user or group of users. The shared identity profile may be shared with the electronic devices of the other user or users by any suitable method including, for example, near field communication (NFC), and by displaying a barcode on the display of one electronic device that may be scanned by the electronic device of the other user or users.

The identity profiles may be stored on the electronic device in, for example, a secured vault, such as a secured password database. Accessing the identity profiles stored on the electronic device may include performing authentication of the user by, for example, prompting the user to enter a password, or utilizing fingerprint or some other biometric verification in order to inhibit unauthorized access to the stored identity profiles.

Figure 3A:
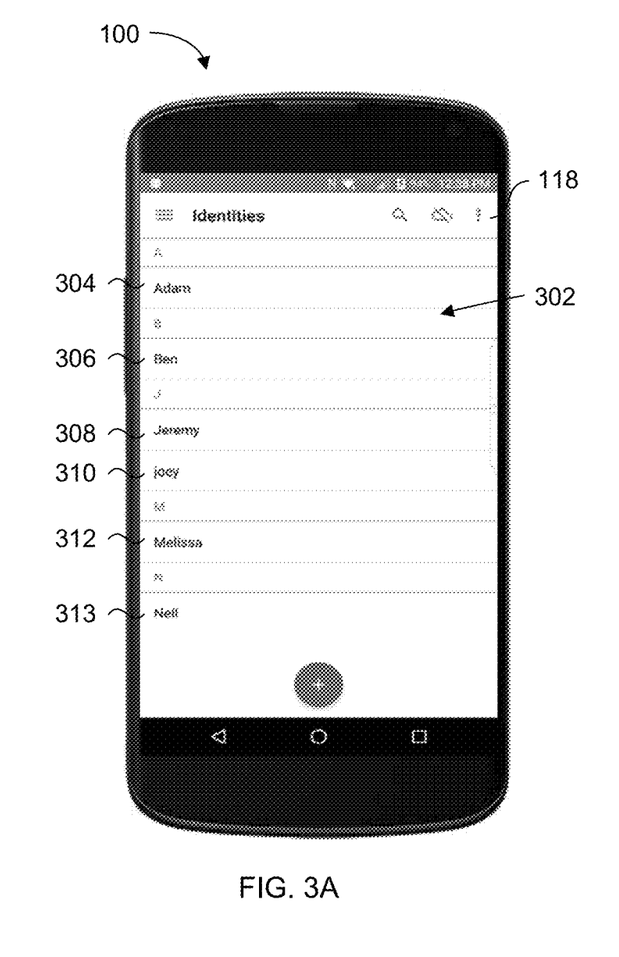
FIGS. 3A and 3B illustrate an example of identity profiles in accordance with the disclosure.
Figure 3B:
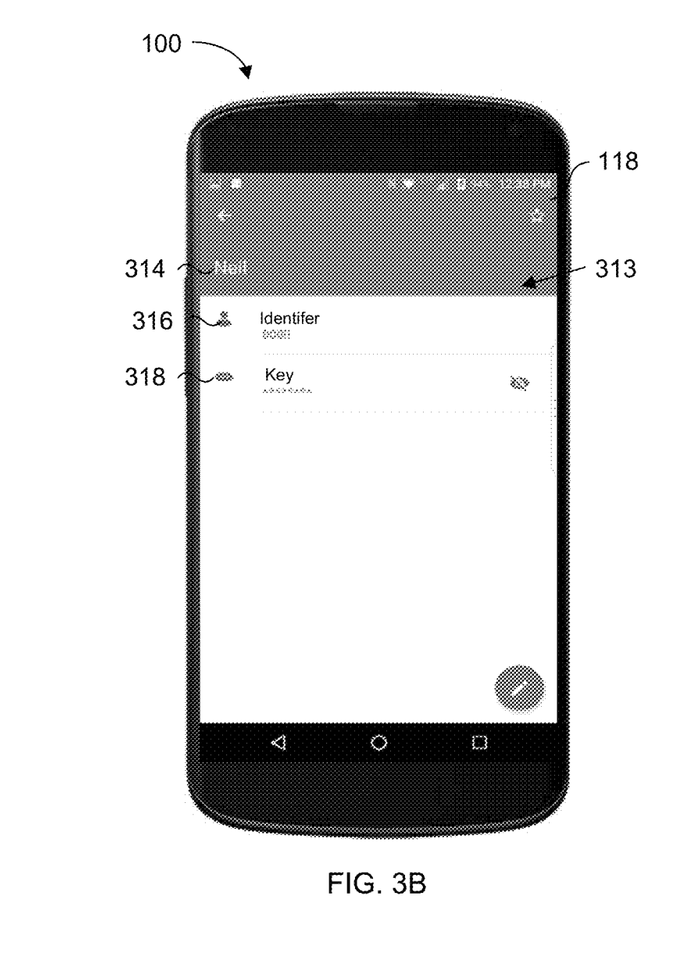

Referring to FIGS. 3A and 3B, an example of various identity profiles stored on an electronic device 100 is shown. FIG. 3A shows a list 302 of the various identity profiles 304 through 313 that is displayed on a touch-sensitive display 118 of the electronic device 100. FIG. 3B shows a display of the one identity profile, identity profile identity 313 from the list 302 of FIG. 3A. The profile identity 313 includes a title 314 associated with, for example, the user or group of users associated with the identity profile 313 and with whom the identity profile is shared. In this case, the title indicates that the identity profile is associated with "Neil". The identity profile 313 also includes an identifier 316, and an encryption key 318. The identity profile 313 may also include other information (not shown) in addition to the title 314, the identifier 316, and the encryption key 318, such as, for example, contact details associated with the user, or group of users, associated with the identity profile, and the type of the identity profile, i.e. either primary or shared.

The identifier 316 in the example shown is a four digit number that uniquely identifies the identity profile 313. When the encryption key 318 is utilized to encrypt data, the encrypted data includes this four digit number in order to identify the encryption key that is needed to decrypt the encrypted data. Although the example shows a four digit identifier 316, a greater or fewer number of digits may be utilized to provide a unique identifier for each identity profile, depending on the number of identity profiles that are desired. In the example shown, the identifier 316 is "0000" which may indicated that the identity profile 313 is the primary identity profile. In this case, Neil is the primary user of the electronic device, and the identity profile 313 may include restrictions on sharing the identity profile 313. In other embodiments, the each identity profile may include an additional field (not shown) that identifies the identity profile type as either primary or shared, and the type may be user selectable.

In the examples described in the present disclosure, the encryption performed is Advanced Encryption Standard 256-bit encryption (AES 256). The key 318 in the example is an AES 256 key, which may be stored in base64 format. However, in practice any suitable encryption method may be utilized, and the key 318 may be any suitable key suitable for the encryption method utilized.

Referring back to FIG. 2, determining the identity profile at 208 may include, for example receiving a selection of an identity profile based on input from a user. For example, the encryption camera application may include a selectable feature such as, for example, an expandable list including the identity profiles, or a portion of the identity profiles, stored on the electronic device. In this example, determining the identity profile includes receiving a selection of one of the identity profiles included in the expandable list.

Authentication of the user may be performed when the user selects an identity profile, particularly if authentication is not performed when the encryption camera application is initiated at 206.

The user may also have an option within the encryption camera application to not select an identity profile such that images are not encrypted. For example, a user may cause the encryption camera application to be initiated, only to determine that encryption is not desired.

In another example, determining the identity profile at 208 may be performed automatically such that the electronic device selects an identity profile. For example, an identity profile may be associated with the particular application from which the input to initiate the encrypted camera application is received. For example, if the input to initiate the encrypted camera application is received via a notes application running on the electronic device, an intention that the image data will be accessible only by the primary user of the electronic device may be assumed. In this example, the primary identity profile may automatically be selected when the encryption camera application is initiated in response to an input received via the notes application. The identity profile associated with a particular application may be user configurable.

In another example, the identity profile may be automatically selected based on the identity profile included in any encrypted information that is displayed, or stored, in associated with the application from which the input to initiate the encrypted camera application is received. For example, in a text messaging application, previous messages of a displayed conversation thread may include encrypted information. As noted above, the encrypted information includes the identifier associated with the identity profile of the encryption key used to encrypt the information.

For example, determining the identity profile may include searching for encrypted information displayed or stored in association with the application from which the input to initiate the encryption camera application was received, determining an identifier included in the encrypted information uncovered in the search. The search for encrypted information may be performed, for example, prior to displaying the encrypted camera application on the display of the electronic device. If encrypted information is determined, then the identifier included in that encrypted information may be utilized to automatically determine the identity profile at 208.

In another example, in a messaging context such as a text messaging application or an email application, the identity profile may be automatically selected based on recipient information associated with the message. For example, the message may be intended to be sent to a user associated with a particular email address or telephone number. In the case in which the identity profiles include contact information such as email addresses and telephone numbers, determining an identity profile may include selecting an identity profile having contact information that matches the recipient information of the message.

For example, the encrypted camera application may be configured to determine the recipient information for a message associated with the application running on the electronic device. The determination may be performed, for example, prior to displaying the encrypted camera application.

In the case in which an identity profile is automatically selected at 208, a user may override the automatically selected identity profile and select a different identity profile.

At 210, image data is received from an image sensor of a camera of the electronic device. The image data may be received in response to a user input to initiate capturing a digital image, such as a still photograph, or a series of digital images, such as a video. The image data may be received in any suitable file format including, for example, a raw image format, Joint Photographic Experts Group (JPEG) format, bitmap (BMP) format, and audio video interleave (AVI)

format. Audio data received from a microphone of the electronic device may be received at 210 in addition to image data received from the image sensor. For example, when taking video utilizing the camera, typically audio data from the microphone will be included in the generated file, in addition to the video data.

In some examples, determining an identity profile 208 may be performed prior to receiving the image data at 210. Alternatively, determining an identity profile may be performed after the image data is received. For example, in some circumstances a user may wish to select one or more of the identity profiles after the image has been captured via the encryption camera application.

At 212, the image data is encrypted utilizing the encryption key associated with the identity profile determined at 208 to generate encrypted image data. In the case in which audio data is received at 210 in addition to the image data, the audio data may also be encrypted at 212 utilizing the encryption key associated with the determined identity profile.

As described previously, the image data may be encrypted using a shared encryption key such that the encrypted image data may be decrypted utilizing the same encryption key. This encryption system is known as a symmetric encryption system. However, in another example, the encryption may be performed utilizing an asymmetric encryption system. In an asymmetric encryption system, a user is associated with two keys, a public key that is shared and a private key that is kept on the user's device and is not shared. Data is encrypted utilizing the public key and decrypted utilizing the private key such that only the user associated with the public key may decrypt the information, assuming that only that user has access to their private key.

In an asymmetric encryption system, the identity profiles described above may function like the certificate system utilized in asymmetric encryption systems such as, for example, certificate utilized in the X.509 standard. In this example, the list of identity profiles 302 shown in FIG. 3A may be a list of certificates, each certificate having an associated public key.

In another example, the encryption may be performed utilizing a combination of symmetric and asymmetric encryption. For example, the image data may be encrypted utilizing a symmetric key, and an encrypted symmetric key is generated for the sender and each recipient utilizing each user's public key. The encrypted image data is shared together with the encrypted symmetric keys such that a recipient is able to decrypt one of the encrypted symmetric keys, then decrypt the image date utilizing the symmetric key. In this example, determining an identity profile at 208 may include selecting more than one identity profile.

As described above, the image data may be received at 210 in any suitable file type. The image data may be encrypted at 212 such that the encrypted image data is included in a file having the same file type as the file type of the image data received at 210.

In an example, the structure of the received image file may remain unchanged, with only the image data contained in the image filed being encrypted. In this way, the image file that includes the encrypted image data may be viewed in an image viewer as any other image file, except that the displayed image when the file is opened is unintelligible. For example, the displayed image may appear as static noise due to the image data included in the image file being encrypted data.

In another example, the file format of the file that includes the encrypted image data may be different than the file format of the file that includes the image data received at 210. For example, the encrypted image data may be included in an image file having a file format different from the file format of the image file including the image data received at 210. In this case, the encrypted image file may be viewed, except that the image displayed when the file is opened is unintelligible as described above.

In another example, the encrypted image data may be included in a file having a file format that is not an image file format. For example, the encrypted image data may be included in any suitable encrypted file format such as, for example, the .aes file format.

At 214, the encrypted image data is added to a document or a file associated with the application. The document that the encrypted image data is added to may depend on the application that is running on the electronic device. For example, in a messaging application, such as a text messaging application or an email application, the document may be a message such that the encrypted image data may be attached to a new message or a message being composed at the time the input to initiate the encrypted camera application was received at 204. In another example, if the input to initiate the encrypted camera application is received via a notes application, the document may be a note such that the encrypted image data may be added to a new note or to a note being composed at the time that the input to initiate the encrypted calendar event was received. In yet another example, if the input to initiate the encrypted camera application is received via a calendar application, the document may be a calendar event such that the encrypted image data may be added to a new calendar event or to a calendar event being created at the time that the input to initiate the encrypted calendar event was received.

In this way, the application running on the device does not have access to the image data prior to encryption in order to improve security in the event, for example, that the application keeps a log or record of all information.

Optionally at 216, the encrypted image data, or the original image data received at 210, or both may be stored in a memory of the electronic device.

The original image data received at 210 may be stored within an encrypted database that is included in a secured portion of the memory that is not publically accessible, such as a portion of the memory associated with a secured vault application. Storing unencrypted image data within an encrypted database provides additional security for the unencrypted image data.

The encrypted image data may be stored in, for example, a secured portion of the memory, such as within a portion of the memory associated with a secured vault application that requires authentication to access. Alternatively, the encrypted image data may be stored in a portion of the memory that is not secured, such as within a photos library associated with a standard camera application, or a database associated with the application from which the input to initiate the encrypted camera application was received.

Whether either of the encrypted image data or original unencrypted image data is stored at 218, and the location at which the image data is stored may be user configurable.

For example, the electronic device may be configured such that data, including images stored in an images database, are uploaded over a network, such as network 150, to a cloud-based database in order to backup data. However, for security reasons, a user may wish to have encrypted image data and the original image data stored in a separate, secure database such that neither of the encrypted image data or the original image data is, for example, uploaded over a network to a cloud-based database.

Referring now to FIG. 4A through 4E, an example of encrypting image data on an electronic device 100 is shown. In the example, the display 118 displays a conversation thread within a text messaging application that is running on the electronic device 100. The conversation thread includes messages sent between the user of the electronic device 100 and a contact, "Ben". In the example shown, the contact "Ben" of this conversation thread may be associated with the identity profile 306, having the title "Ben", shown in the example shown in FIG. 3A. In this example, the identity profile 306 has been shared between the electronic device 100 and an electronic device (not shown) associated with the contact Ben such that Ben is able to decrypt the received messages, is able to encrypt messages sent from the electronic device associated with Ben.

Figure 4A:
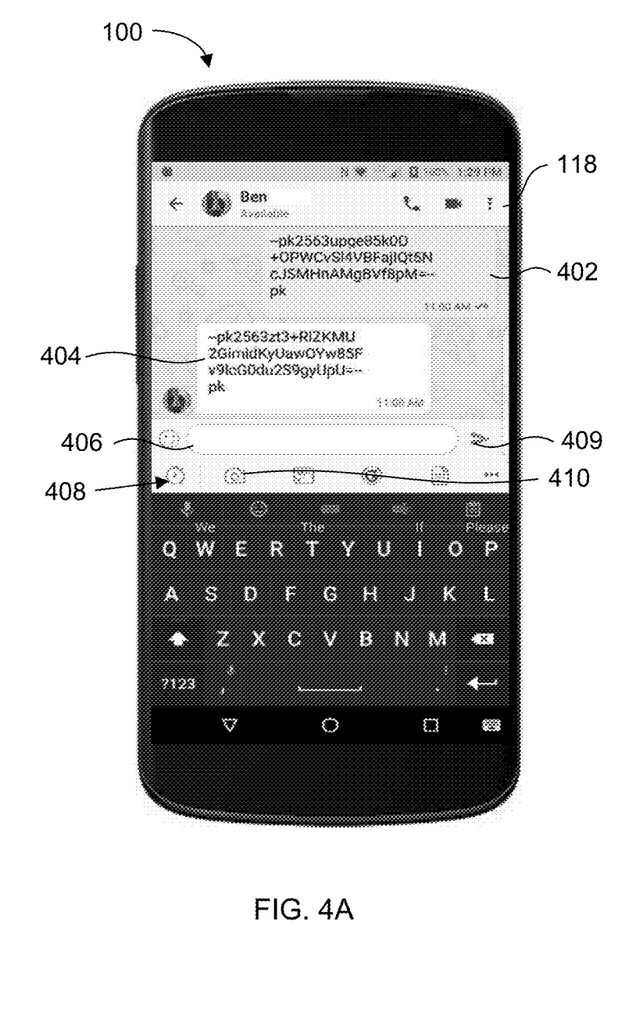
FIG. 4A through FIG. 4E illustrate an example of encrypting information in accordance with the disclosure.

As shown in FIG. 4A, the displayed information associated with the text messaging application includes previously sent messages 402, 404, and a text entry field 406.

In the example shown in FIG. 4A through 4E, the previous messages 402, 406 in the example shown have been encrypted utilizing AES 256, however any encryption is possible. In the AES 256 format utilized in the present examples, encrypted information has the following format:
--pk2563zt3+RIZKMU2GimidKyUawOYw85Fv9kcG09--pk.

The encrypted text is identified by the starting and ending tags "--pk". The first four digits of the encrypted text after the starting tag, e.g., "2563" in the example shown, is the identifier of the identity profile that includes the encryption key utilized to encrypt the information. In the example shown, the identifier "2563" may be associated with the identity profile 306 shown in FIG. 3A, which includes the title "Ben". The identifier included in the encrypted text is utilized to determine which encryption key to utilize to decrypt the encrypted information, as described in more detail below.

The information associated with the text messaging application also includes a toolbar 408. The toolbar 408 includes selectable features that are each associated with a particular function of the electronic device 100. The toolbar 408 shown in the example includes a camera selectable feature 410. Selection the camera selectable feature 410 may be received as an input via the text messaging application to initiate an encrypted camera application as described with reference to 204 in FIG. 2.

Figure 4B:
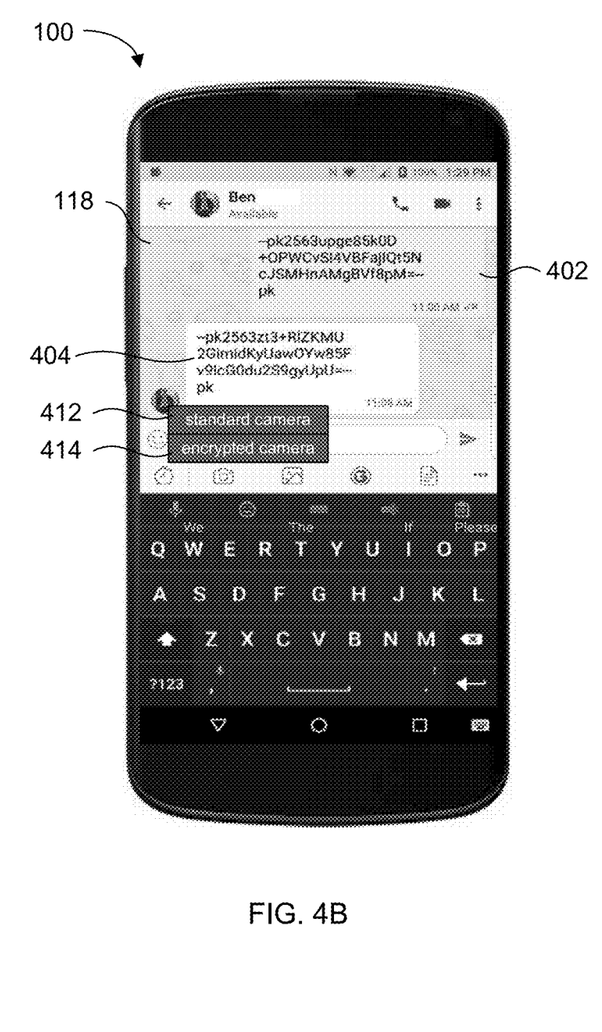

FIG. 4B shows the electronic device after a selection of the camera selectable feature 410 is received. In the example shown, further selectable features 412, 414 are displayed associated with initiating a standard camera application and initiating an encrypted camera application, respectively. In this example, the input to initiate the encrypted camera application is received after the user has selected the selectable feature 414.

In other examples, the encrypted camera application may be the default camera application such the additional selectable features 412, 414 are not displayed and the input to initiate the encrypted camera application is received when the camera selectable feature 410 is selected. As described above, the default camera application for a particular application may be user configurable. In another example, selecting the camera selectable feature 410 may launch the standard camera application, which may include a displayed selectable feature to initiate the encrypted camera application.

Figure 4C:
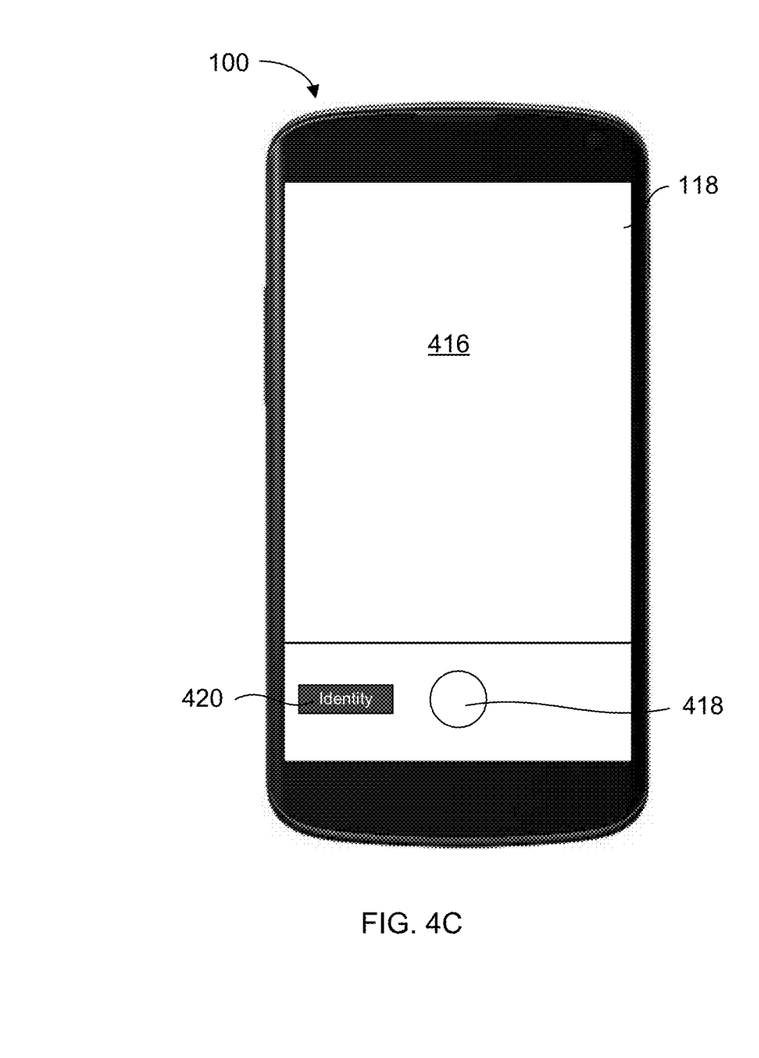
Figure 4D:
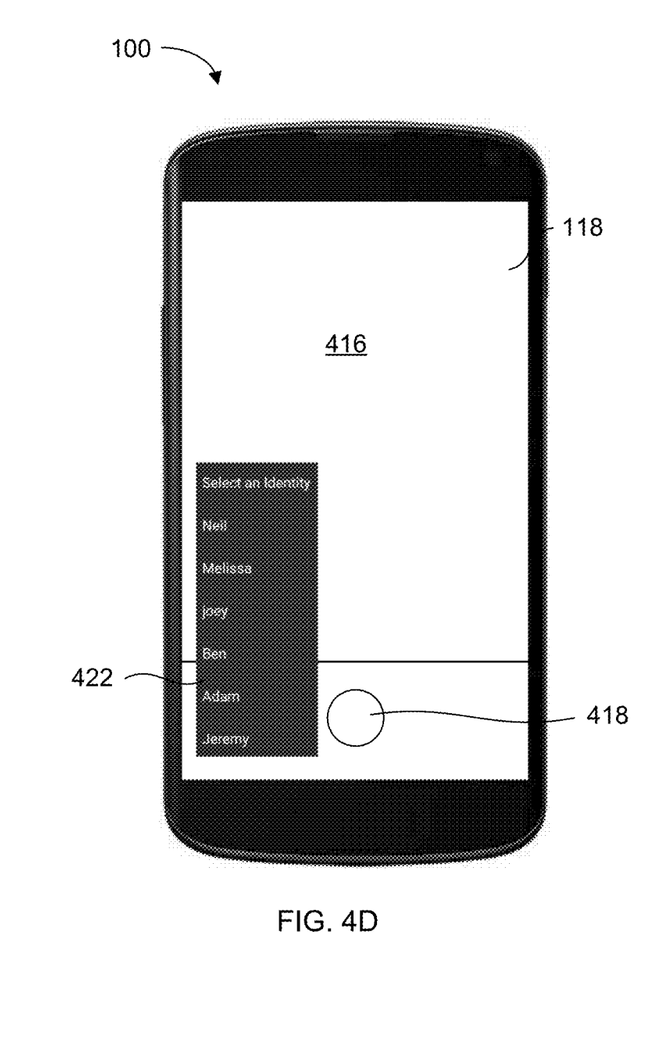

FIG. 4C shows the electronic device 100 after the encrypted camera application is initiated. The encrypted camera application may be displayed on the display 118 overlayed on the text messaging application, i.e., the application from which the input to initiate the encryption camera application is received from. In some examples, the encryption camera application may be overlaid over a portion of the display 118 only, such that the remaining portion of the display 118 displays the text messaging application. Alternatively, the encrypted camera application may be initiated such that the encrypted camera application is running on the electronic device 100.

After the encryption camera application is initiated, a view finder region 416 is displayed on the display 118, which shows an image captured by the camera (not shown in FIG. 4A through 4E) of the electronic device 100. The example encryption camera application shown in FIG. 4C also includes an image capture selectable feature 418 that is displayed on the display 118. The image capture selectable feature may be selected to cause the image shown in the view finder region 416 to be captured by the image sensor as image data, and received as described above with reference to 210 in FIG. 2.

The encrypted camera application also includes an identity profile selectable feature is also displayed on the display 118. The identity profile selectable feature may be selected in order to determine which identity profile to utilize to encrypt image data received in the encrypted camera application. In the example shown, the identity profile selectable feature 420 expands when selected to a list 422 of identity profiles stored on the electronic device. The identity profile selectable feature 420 may be expanded by, for example, performing a tap gesture on the touch-sensitive display 118 at the location that the identity profile selectable feature 420 is displayed. Selection of one of the identity profiles may be received in response to a tap gesture being performed at a location on the touch-sensitive display 118 in which that identity profile is displayed in the list 422.

Alternatively, or in addition to displaying the identity profile selectable feature 420, an identity profile may automatically be selected as described above. For example, the identity profile 306 may be the default identity profile associated with the conversation thread between the user and the contact Ben. In another example, the identity profile 306 may be automatically selected by determining the identifier "2563" included in the encrypted information included in the previous messages 402, 404. In yet another example, the contact information associated with the contact "Ben" may be included in the identity profile 306, and this contact information is matched to recipient information of the conversation thread with Ben, resulting in the identity profile 306 being automatically selected. In an example, the automatically selected identity profile may be overridden by, for example, selecting another identity profile from the list 422.

After the identity profile is determined and the image data is received in response to a selection of the image capture selectable feature 418, the image data is encrypted to generate encrypted image data which is included in a document associated with the text messaging application. In the example shown in FIG. 4A through 4E, the encrypted image data may be passed to the text messaging application and is transmitted when the user selects a send selectable feature 409 (shown in FIG. 4A). In an example, a thumbnail associated with the file that includes the encrypted image data, similar to thumbnail 426 shown in FIG. 4E, may be included in the text entry field 406 such that a user may optionally include additional text to send with the encrypted image data prior to the encrypted image data being transmitted.

Figure 4E:
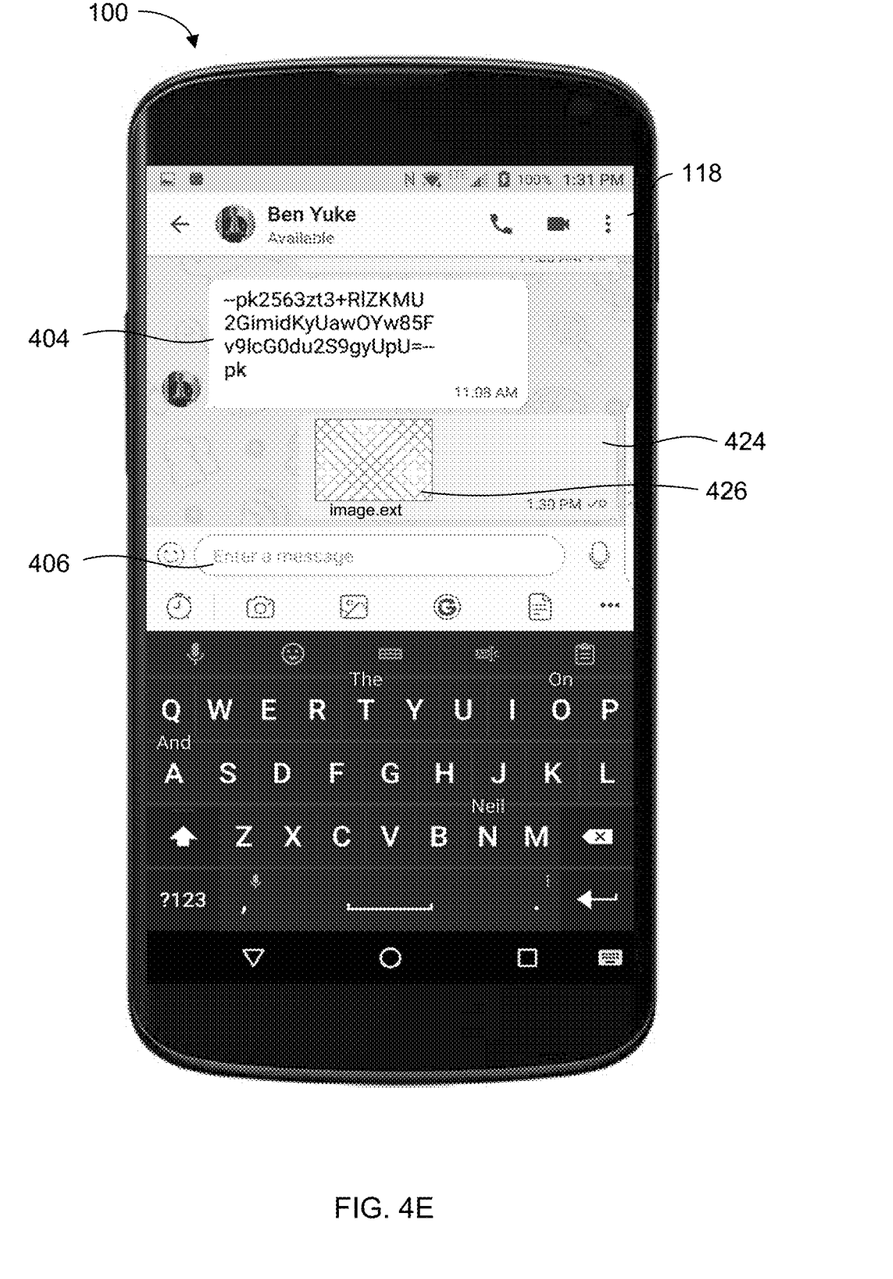

FIG. 4E shows the text messaging application after the file that includes the encrypted image data, called "image.ext" in the example shown, is sent in a new message 424. The message 424 in the example shown in FIG. 4E includes a thumbnail 426 that is associated with the file image.ext. However, any suitable method of including the encrypted image data in the message 424 may be utilized.

The ".ext" portion of the filename image.ext represents an extension of the particular file format of the file that the encrypted image data is included in. As disclosed above, the file format may be, for example, a standard image format such that the image.ext file is viewable similar to a standard image file, however the image displayed on the display 118 will be unintelligible. The file format may be the same file format as the file format of the originally received image data, or may be a different image format.

Alternatively, the file format of the image.ext file may not be an image file. For example, the image.ext file may be an encryption file such as a file having an .aes file format.

In order to view the attached image.ext file in the message 424, a user may, for example, select the thumbnail 426 or the message 424. In response to selecting the thumbnail 426 or the message 424, the encrypted image data is decrypted to generate decrypted image data. The decrypted image data may be displayed in an overlay window (not shown) or may displayed in the message 424 by replacing the image.ext file with a new file that includes the decrypted image data.

As described above, the encrypted information is decrypted utilizing the encryption key associated with an identifier included in the encrypted image data. For example, if the determined identity profile is identity profile 306 associated with the contact "Ben", the identifier associated with the identity profile 306 will be included in the encrypted image data. This identifier is utilized by the electronic device 100 to determine which stored identity profile's encryption key to use to decrypt the encrypted image data. Similarly, the recipient of the message 424 is able to decrypt the encrypted image data if the determined identity profile has been shared with the recipient. In this way, only those intended recipients with whom the identity profile has been shared are able to decrypt and view the image.ext file sent in message 424.

Although the above example described with reference to FIG. 4A through 4E include an electronic device 100 having a touch-sensitive display 118, it is understood that the examples also apply to electronic devices that include displays that are not touch-sensitive. For example, rather than receiving gesture inputs from a touch-sensitive display, the various inputs may be received by any suitable input device such as, for example, the navigation device 140 of the electronic device 100.

Disclosed herein are electronic devices and methods for encrypting image data on an electronic device. Advantageously, the image data may be received and encrypted separate from an application that the encrypted image data is included within such that the application does not have access to the unencrypted image data. In this way, security of sensitive images may be increased by inhibiting access by applications to unencrypted image data. Further, image data may be encrypted and included within an application that does not itself include encryption functionality. Further still, the method facilitates encrypting and decrypting image data across multiple applications utilizing a single identity profile, facilitating utilizing a single set of shared credentials to be used to share encrypted image data across multiple applications and platforms.

The scope of the claims should not be limited by the preferred embodiments set forth in the examples, but should be given the broadest interpretation consistent with the description as a whole.

What is claimed is:

1. A method of encrypting information on an electronic device having a camera, the method comprising:
    displaying information associated with an application running on the electronic device;
    receiving, via the application running on the electronic device, an input to initiate an encrypted camera application that is separate from the application running on the electronic device;
    initiating the encrypted camera application;
    determining an identity profile having an associated key;
    receiving an input from the encrypted camera application to collect image data with the camera;
    receiving image data from an image sensor of the camera;
    encrypting the image data utilizing the key associated with the determined identity profile to generate encrypted image data;
    adding the encrypted image data to a document associated with the application running on the electronic device.

2. The method of claim 1, wherein determining an identity profile comprises receiving a selection of an identity profile from a plurality of identity profiles stored on the electronic device.

3. The method of claim 1, wherein:
    the information associated with the application running on the electronic device includes a selectable feature associated with initiating the encryption camera application; and
    receiving an input comprises receiving a selection of the selectable feature.

4. The method of claim 1, wherein determining an identity profile comprises automatically selecting an identity profile.

5. The method of claim 4, wherein automatically selecting an identity profile comprises selecting a default identity profile associated with the application running on the electronic device.

6. The method of claim 4, wherein:
    the application running on the electronic device is a messaging application; and
    automatically selecting an identity profile comprises:
        determining that the message application includes a previous message containing encrypted information;
        selecting an identity profile associated with an identifier associated with the second encrypted information.

7. The method of claim 1, further comprising storing the encrypted image data in a memory of the electronic device.

8. The method of claim 7, wherein the encrypted image data is stored in a secured database that is separate from a database storing unencrypted image data.

9. The method of claim 1, wherein the encrypted image data is stored utilizing a file type that is the same as a file type of the image data received from the image sensor.

10. The method of claim 1, wherein the encrypted image data is stored utilizing a file type that is different than a file type of the image data received from the image sensor.

11. An electronic device for encrypting information, the electronic device comprising:
    a display for displaying information;
    a camera having an image sensor;

a processor operably coupled to the camera and the display and configured to:
  display on the display information associated with an application running on the electronic device;
  receive, via the application running on the electronic device, an input to initiate an encrypted camera application that is separate from the application running on the electronic device;
  initiate the encrypted camera application;
  determine an identity profile having an associated key;
  receive an input via the encrypted camera application to collect image data from the image sensor;
  receive image data from the image sensor;
  encrypt the image data utilizing the key associated with the determined identity profile to generate encrypted image data;
  add the encrypted image data to a document associated with the application running on the electronic device.

12. The electronic device of claim 11, wherein determining an identity profile comprises receiving a selection of an identity profile from a plurality of identity profiles stored on the electronic device.

13. The electronic device of claim 11, wherein:
the information associated with the application running on the electronic device includes a selectable feature associated with initiating the encryption camera application; and
receiving an input comprises receiving a selection of the selectable feature.

14. The electronic device of claim 11, wherein determining an identity profile comprises automatically selecting an identity profile.

15. The electronic device of claim 14, wherein automatically selecting an identity profile comprises selecting a default identity profile associated with the application running on the electronic device.

16. The electronic device of claim 14, wherein:
the application running on the electronic device is a messaging application; and
automatically selecting an identity profile comprises:
  determining that the message application includes a previous message containing encrypted information;
  selecting an identity profile associated with an identifier associated with the second encrypted information.

17. The electronic device of claim 11, wherein the processor is further configured to store the encrypted image data in a memory of the electronic device.

18. The electronic device of claim 11, wherein the encrypted image data is stored in a secured database that is separate from a database storing unencrypted image data.

19. The electronic device of claim 11, wherein the encrypted image data is stored utilizing a file type that is the same as a file type of the image data received from the image sensor.

20. The electronic device of claim 11, wherein the encrypted image data is stored utilizing a file type that is different than a file type of the image data received from the image sensor.

* * * * *